(12) United States Patent
Ruffet et al.

(10) Patent No.: US 7,727,390 B2
(45) Date of Patent: Jun. 1, 2010

(54) OIL FILTER DEVICE FOR AN INTERNAL COMBUSTION ENGINE

(75) Inventors: Valentin Ruffet, Stuttgart (DE); Hans-Martin Ruppert, Ostfildren (DE)

(73) Assignee: Mahle International GmbH, Stuttgart (DE)

( * ) Notice: Subject to any disclaimer, the term of this patent is extended or adjusted under 35 U.S.C. 154(b) by 0 days.

(21) Appl. No.: 12/158,567

(22) PCT Filed: Dec. 14, 2006

(86) PCT No.: PCT/DE2006/002253

§ 371 (c)(1),
(2), (4) Date: Jun. 20, 2008

(87) PCT Pub. No.: WO2007/076810

PCT Pub. Date: Jul. 12, 2007

(65) Prior Publication Data

US 2009/0001010 A1     Jan. 1, 2009

(30) Foreign Application Priority Data

Dec. 21, 2005 (DE) .................. 10 2005 061 186

(51) Int. Cl.
*B01D 35/16* (2006.01)
*B01D 35/31* (2006.01)
(52) U.S. Cl. ..................... 210/232; 210/248
(58) Field of Classification Search ............ 210/232, 210/248
See application file for complete search history.

(56) References Cited

U.S. PATENT DOCUMENTS

| | | |
|---|---|---|
| 5,655,624 A | 8/1997 | Kelly, Jr. |
| 5,857,503 A | 1/1999 | Vreeken |
| 6,101,996 A * | 8/2000 | Arita et al. ............... 123/196 A |
| 6,146,527 A * | 11/2000 | Oelschlaegel ............... 210/232 |
| 2004/0055827 A1 | 3/2004 | Carlson |
| 2007/0080106 A1* | 4/2007 | Gilles et al. .................. 210/450 |

FOREIGN PATENT DOCUMENTS

DE     1 040 843     4/1959

(Continued)

OTHER PUBLICATIONS

English Abstract for DE 100 64 482.
English Abstract for DE 103 58 709.
English Abstract for DE 100 26 815.
English Abstract for DE 200 00 524.
Delphion printout with English title for EP1254692 (which is a family member of DE 60200360) (4 pages).

(Continued)

*Primary Examiner*—Thomas M Lithgow
(74) *Attorney, Agent, or Firm*—Rader, Fishman & Grauer PLLC

(57) ABSTRACT

The invention relates to an oil filter device (1) for an internal combustion engine, comprising a support element (2) and a substantially cylindrical filter cartridge (3) which can be connected, especially screwed, to the support element (2). The invention is characterized in that the filter cartridge is arranged essentially in an upright position while an annular duct (4) which surrounds the filter cartridge (3) in the screwed-on state is embodied inside the support element (2). The duct (4) is fluidically separated from the interior of the filter cartridge (3) when the filter cartridge is screwed on while said separation is eliminated when the filter cartridge (3) is removed. Furthermore, the duct (4) is configured as a drainage duct and is fluidically connected to an oil reservoir when the filter cartridge (3) is removed such that the filter cartridge is easy to replace while no oil is spilled, preventing pollution of the environment.

13 Claims, 3 Drawing Sheets

FOREIGN PATENT DOCUMENTS

Figure 1:
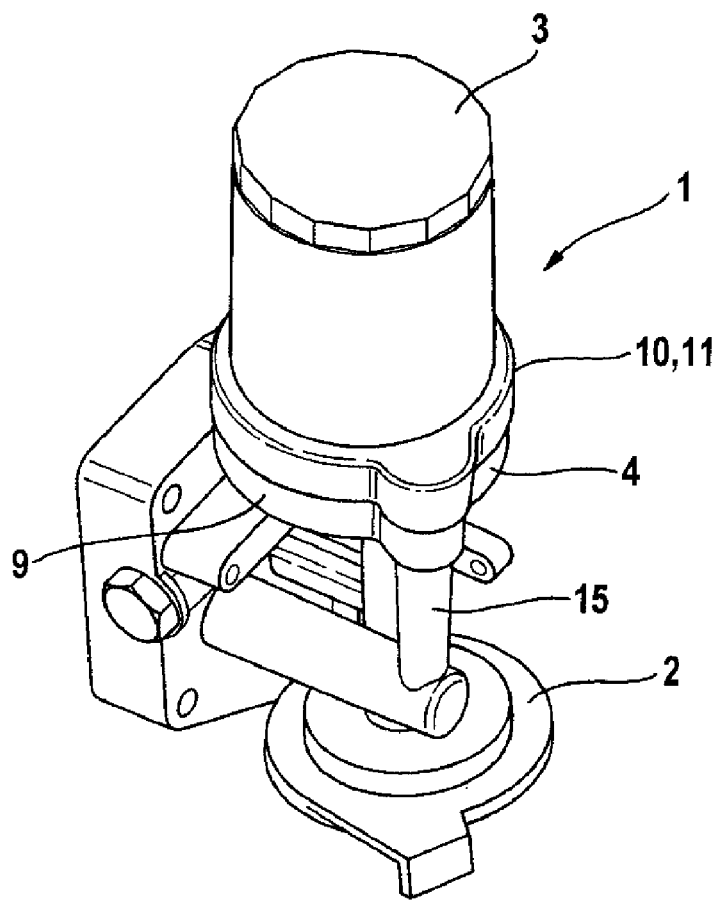

| | | |
|---|---|---|
| DE | 36 22 154 | 5/1987 |
| DE | 200 00 524 | 5/2000 |
| DE | 100 26 815 | 12/2001 |
| DE | 100 64 482 | 7/2002 |
| DE | 103 58 709 | 4/2005 |
| DE | 602 00 360 | 5/2005 |
| WO | WO 2004087290 A1 * | 10/2004 |
| WO | WO-2006/097086 | 9/2006 |

OTHER PUBLICATIONS

Printout of US equivalent US 4863599 for DE 36 22 154 (4 pages).
Printout of US equivalent US 2743018 for DE 1 040 843 (5 pages).

* cited by examiner

OIL FILTER DEVICE FOR AN INTERNAL COMBUSTION ENGINE

CROSS-REFERENCE TO RELATED APPLICATION

This application is a U.S. national phase of International application PCT/DE2006/002253 filed Dec. 14, 2006, which claims priority to German application DE 10 2005 061 186.9, filed Dec. 21, 2005, which are hereby incorporated by reference in their entirety.

The present invention relates to an oil filter device for an internal combustion engine according to the definition of the species of claim 1. The invention also relates to a filter cartridge having a cover for such a filter device and a cover for a filter cartridge.

Due to the constant increase in environmental requirements and the associated obligation to deal with pollutants such as used oil carefully, it has become necessary to describe the maintenance and/or replacement of oil filters in such a way that no oil enters the environment and contaminates it, if possible. In the case of screw-on filter cartridges of the known type, there is the problem here that any oil still in the system may enter the environment when the filter cartridge, which is arranged so that it hangs downward, is unscrewed. This is normally prevented by the fact that all the oil is drained out or pumped out through a drain screw in an oil collecting pan before replacing the filter cartridge and an oil collecting pan is placed beneath the filter cartridge while the filter cartridge is being unscrewed so that any residual oil that has not been removed and/or cannot be removed by draining and/or suction can drip down and be collected by the oil collecting pan. However, it is also problematical here that the residual oil still remaining in the filter device can already run out of the filter device even while unscrewing the filter cartridge and under some circumstances can soil the hands and/or tools of the mechanic. Since frequent contact of the skin with contaminated used oil should be avoided if possible, the mechanics should use appropriate protective gloves for unscrewing the filter cartridges.

The present invention relates to the problem of providing an improved embodiment for an oil filter device for an internal combustion engine of the type defined in the introduction, this embodiment being characterized in particular by the fact that the oil in the system need not first be drained out to replace the filter cartridge and nevertheless does not enter the environment when replacing the filter cartridge.

This problem is solved according to the present invention by the subject matters of the independent claims. Advantageous embodiments are the subject matter of the dependent claims.

The present invention is based on the general idea of arranging a screw-on filter cartridge in an oil filter device for an internal combustion engine comprising essentially a support element and a filter cartridge that can be screwed onto it so that the latter is upright and to provide a drain system in the support element which reliably collects any residual oil running out of the filter cartridge when the latter is unscrewed. The drain system is designed in the form of a ring-shaped channel which surrounds the filter cartridge when it has been screwed in. When the filter cartridge is screwed in, the channel is fluidically separated from the interior of the filter cartridge, whereas this separation is canceled when the filter cartridge is released. When the filter cartridge is unscrewed, the fluidic separation is thus canceled and any residual oil still remaining in the filter cartridge can flow into the channel, the latter being of such dimensions that it is capable of receiving all the residual oil still in the filter cartridge. According to the present invention, the channel is designed as a drainage channel and is fluidically connected to an oil reservoir, e.g., an oil collecting pan, when the filter cartridge is released. This offers the advantage that when the filter cartridge is loosened, i.e., unscrewed, the oil running out of it will flow back into the oil reservoir through the channel to be collected there. The present invention thus offers the great advantage that, on the one hand, it is no longer necessary to first drain out the oil before replacing the filter cartridge, and secondly, due to the inventive ring-shaped channel, the residual oil still in the filter cartridge is reliably collected so that it does not enter the environment and cannot cause pollution of the environment. Due to the elimination of the step of draining or suction removal of the oil before dismantling the filter cartridge and refilling and/or topping off the oil after successfully replacing the filter cartridge, considerable cost advantages are achieved in maintenance of the internal combustion engine. At the same time, neither the mechanic, the tools nor the environment is endangered due to the residual oil which is still in the filter device and runs out of the filter device downward toward the bottom when replacing the filter cartridge.

In another advantageous embodiment of the inventive approach, the channel is covered by sealing means when the filter cartridge is screwed in place. Therefore, the channel is protected from dirt and/or moisture, so that soiling of the channel can be prevented during operation of the filter device. This offers the advantage that no dirt can be deposited in the channel to then be flushed into the oil collecting pan, where it would cause contamination of the oil, by the oil coming out of the filter cartridge when the latter is unscrewed.

The sealing means expediently includes a cover which is held on the filter cartridge. Thus the cover can simply be screwed on and off together with the filter cartridge and need not be removed and/or reinstalled in a separate operation. This has an especially favorable effect on maintenance costs.

In another advantageous embodiment, the cover is rotatably mounted on the filter cartridge. Such a rotatable mounting allows a relative movement between the filter cartridge and the cover so that the cover can easily be positioned with regard to a predefined position in relation to the support element, for example.

According to an advantageous further embodiment of the present invention, a cover designed as a collar has an inside contour that is in contact with the filter cartridge with a catch contour thereon that acts axially and is directed toward the filter cartridge, engaging in a counter-catch contour designed with a complementary shape on the filter cartridge, and whereby the counter-catch contour is designed as a circumferential groove and therefore allows a rotatable mounting of the collar on the filter cartridge over the catch contour engaging in the circumferential groove. Such a catch contour on the cover and/or a counter-catch contour on the filter cartridge constitutes an especially simple option for an axially secured rotatable mounting of the cover on the filter cartridge. At the same time, the catch contour allows the cover to be removed from the filter cartridge, depending on the design, so that when replacing the filter cartridge, only the latter need be replaced, whereas the cover can still be used. This embodiment also allows distribution of just one of the two components, so that a situation that is interesting for the spare parts business in particular can be achieved. In addition, this allows a reduction in waste because the cover, depending on the design, often has a longer lifetime than the filter cartridge and therefore can be used for a longer period of time and need not necessarily be replaced at the same time as the filter cartridge is replaced. This of course also reduces maintenance costs because only the filter cartridge need be exchanged, i.e., replaced, while the cover can be reused.

In another advantageous embodiment, the support element has a first clean channel connecting piece with an outside thread and the filter cartridge has a second clean channel connecting piece with a complementary design and an inside thread, whereby recesses are provided in the first clean channel connecting piece, interrupting the outside thread, so that residual oil in the filter cartridge can flow out of the filter cartridge and into the channel when the filter cartridge is being unscrewed. This makes it possible to achieve the result that the residual oil that is still in the filter cartridge can flow into the channel even while the cartridge is being unscrewed and not only when the filter cartridge is removed so that the period of time required to allow the oil to drain out of the filter cartridge can be reduced. The oil begins to flow out already when the screw connection is released, and in the best case this process is already concluded when the filter cartridge is completely unscrewed, thus making it possible to avoid a waiting time after unscrewing the filter cartridge for emptying same. This also shortens the filter cartridge replacement time and therefore reduces maintenance costs.

The cover is expediently made of plastic. Therefore, such covers can be manufactured easily and inexpensively, e.g., by an injection molding process, and can be adapted to almost any shape requirements. At the time, depending on the properties of the plastic, a robust and long-lasting cover can be created.

It is self-evident that the features mentioned above and those yet to be explained below may be used not only in the particular combination given but also in other combinations or alone without going beyond the scope of the present invention.

Preferred exemplary embodiments of the present invention are depicted in the drawings and are explained in greater detail in the following description.

The drawings show, each schematically

Figure 2:
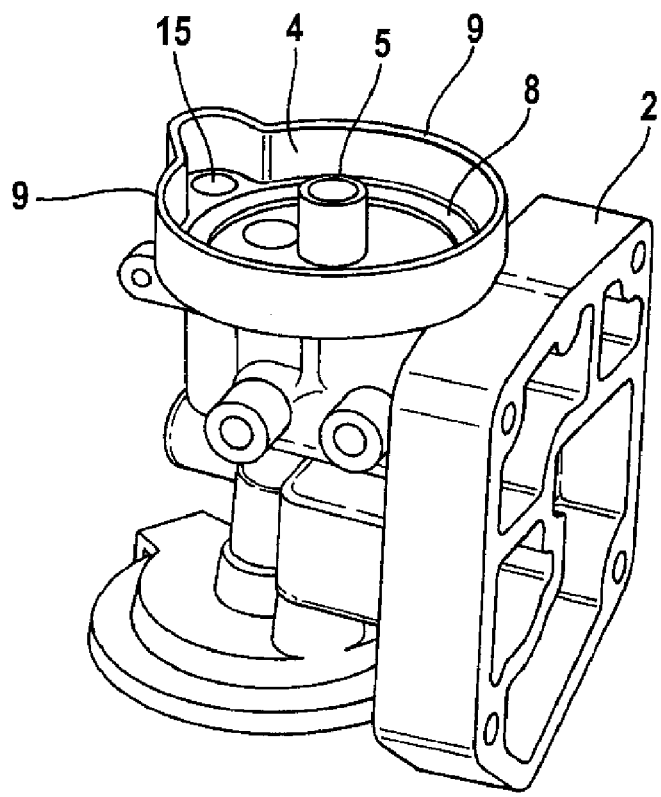
Figure 3:
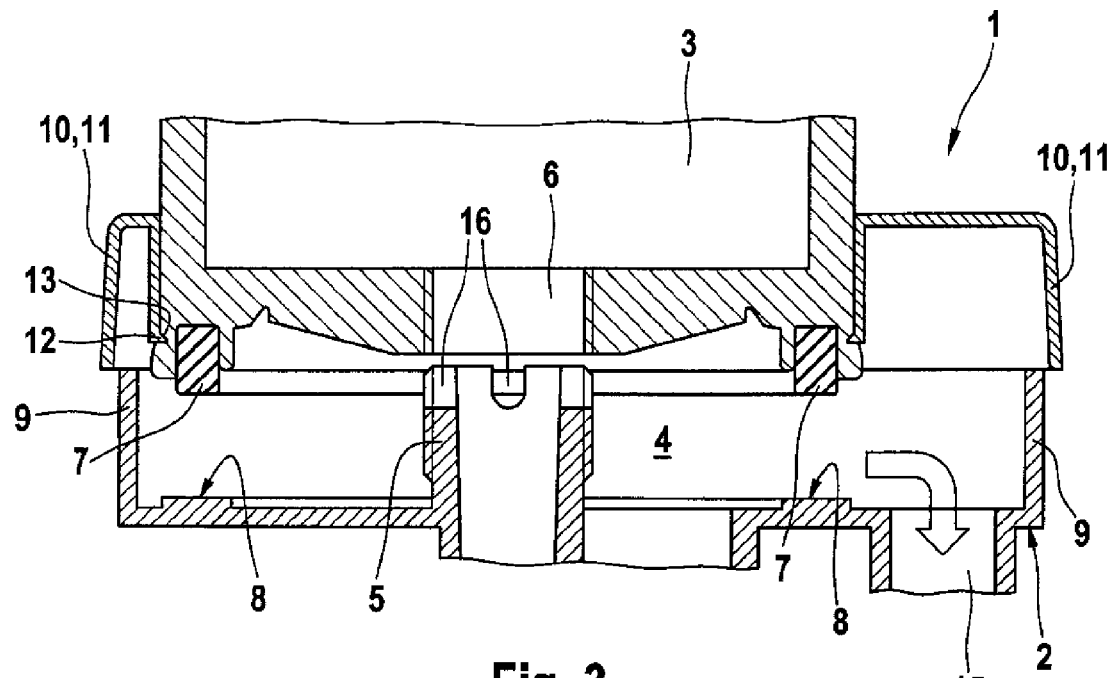
Figure 4:
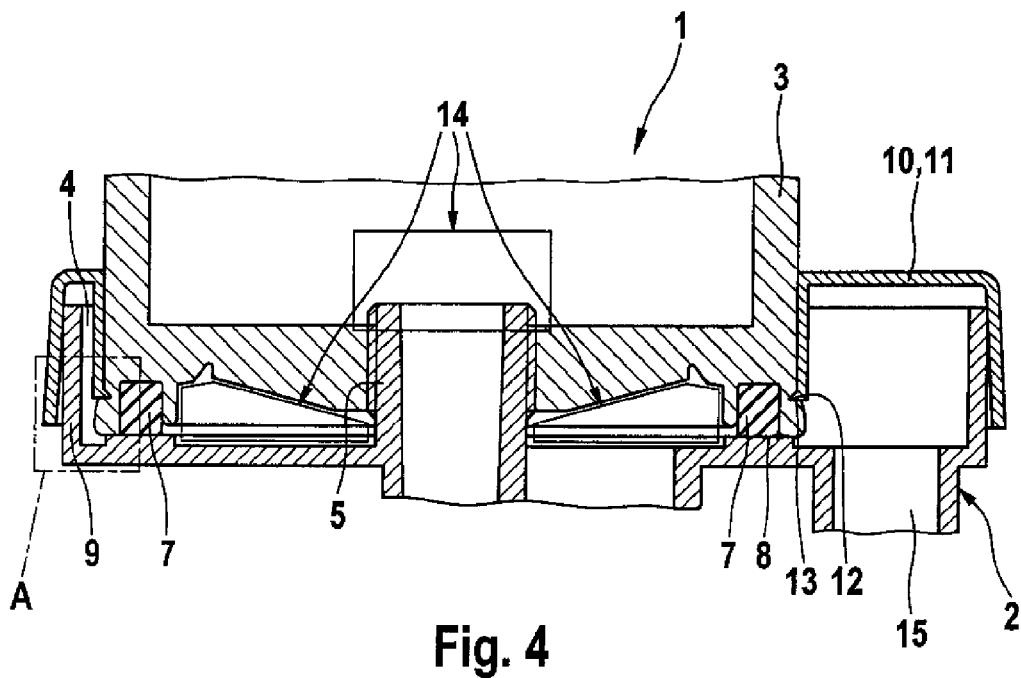
Figure 5:
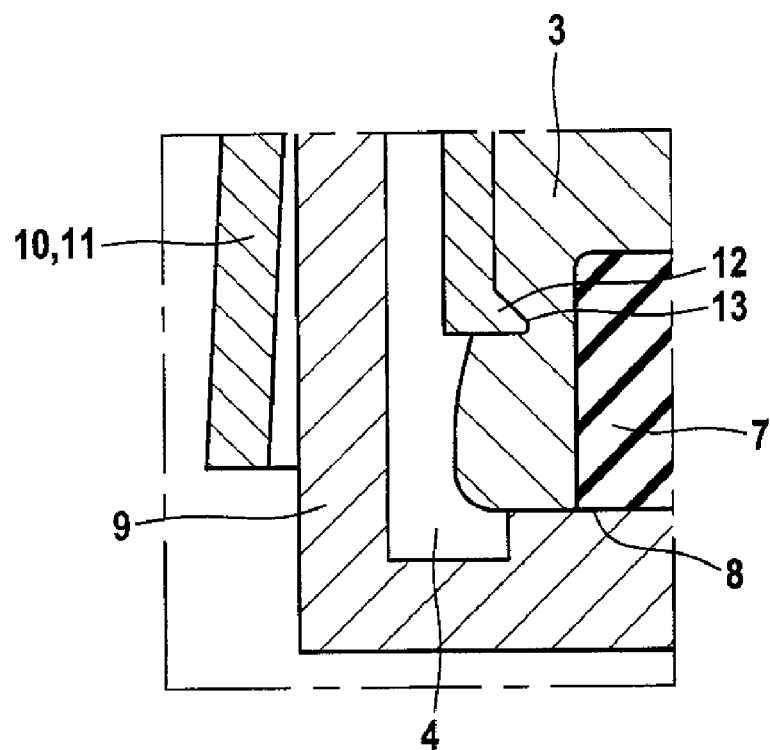
Figure 6:
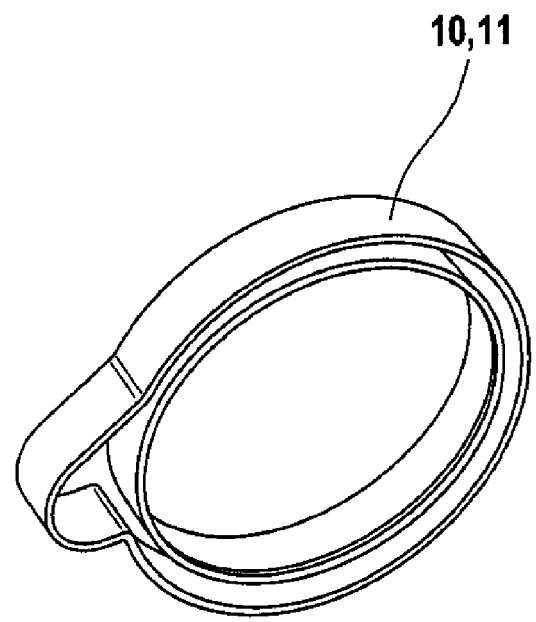

FIG. 1 a perspective view of an inventive oil filter device,

FIG. 2 a perspective view of a support element for the oil filter device,

FIG. 3 a cross section through the oil filter device in the area of the connection of the filter cartridge to the support element when the filter cartridge is detached, FIG. 4 a diagram like that in FIG. 3 but with the filter cartridge screwed on, FIG. 5 an enlarged sectional diagram of area A from FIG. 4, FIG. 6 a view of an inventive cover.

According to FIG. 1, an inventive oil filter device 1, e.g., for an internal combustion engine, has a support element 2 and an essentially cylindrical filter cartridge 3, which can be connected to the support element, especially by screwing it thereon. The support element 2 is designed as a filter base and is preferably made of a diecast material, especially diecast aluminum. In contrast with traditional hanging filter cartridges, with the inventive oil filter device 1, the filter cartridge 3 is arranged essentially upright over the support element 2. This allows replacement of the filter cartridge 3 from above, so it is not necessary to raise the vehicle by means of an elevator platform or to crawl under the vehicle.

According to FIG. 2, a ring-shaped channel 4 is provided in the support element 2, surrounding the filter cartridge 3 after it has been screwed in place (see also FIGS. 3 and 4). For connecting the filter cartridge 3 to the support element 2, the support element 2 has a first clean channel connecting piece 5 with an outside thread, and the filter cartridge 3 has a second clean channel connecting piece 6, which is designed to be complementary to the filter cartridge and has an inside thread (see FIG. 3). The filter cartridge 3 is screwed onto the support element 2 over the two clean channel connecting pieces 5 and 6. When screwed in place, the filter cartridge 3 is pressed against the support element 2 in such a way that a gasket 7 is in contact with the filter cartridge 3, e.g., a ring gasket is in tight contact with a sealing surface 8 formed on the support element 2.

As shown in FIGS. 2 through 4, the channel 4 is bordered on its circumference by a circumferential wall 9 of the channel, whereby the filter cartridge 3 is sealed/covered with respect to this channel circumferential wall 9 by sealing means 10. When the filter cartridge 3 is screwed in place, the channel 4 is covered, i.e., sealed by the sealing means 10. The sealing means 10 may comprise a cover 11, which is held on the filter cartridge 3. The cover 11 is preferably rotatably mounted on the filter cartridge 3.

To implement the rotatable mounting, the cover 11 has a catch contour 12 which acts axially and is directed toward the filter cartridge 3 on the inside contour of the cover, which is in contact with the filter cartridge 3 on its circumference. The catch contour 12 engages in a counter-catch contour formed with a complementary shape on the filter cartridge 3, the counter-catch contour 13 being designed as a circumferential groove, for example, so that the cover 11 is rotatably mounted on the filter cartridge 3 via the catch contour 12, which engages in the circumferential groove. The catch contour 12 is preferably designed as a catch ring and/or as a catch web. The cooperation between the catch contour 12 on the one hand and the counter-catch contour 13, on the other hand, secures the rotatable mounting of the cover 11 not only on the filter cartridge 3 but also on the filter cartridge 3 in the axial direction. At the same time, the catch engagement between the filter cartridge 3 and the cover 11 allows the cover 11 to be attached to and/or removed from the filter cartridge 3.

FIG. 3 shows the filter cartridge 3 in a condition in which it has been released, i.e., unscrewed from the support element 2, whereby the first clean channel connecting piece 5 does not yet cooperate with the second clean channel connecting piece 6. The gasket 7 is also not yet in contact with the sealing surface 8 of the support element 2, so that the channel 4 is still open. The cover 11 is locked to the filter cartridge 3 via its catch contour 12 and checks the channel 4.

FIG. 4 shows the filter cartridge 3 which is fixedly screwed to the support element 2, whereby the gasket 7 is in sealing contact with the respective sealing surface 8 of the support element 2. The channel 4 is covered at the top by the cover 11 and is thus reliably protected from soiling. When replacing the filter cartridge 3, it is unscrewed by turning it, starting from the condition illustrated in FIG. 4, whereby any residual oil volumes 14, indicated here by suitably outlined areas, enter the channel 4 when the filter cartridge 3 is unscrewed and when the filter cartridge 3 is unscrewed further, the gasket 7 is released from the respective sealing surface 8, establishing a connection between the channel 4 and the drain channel 15, which is fluidically connected to an oil reservoir (not shown). To accelerate the drainage of any residual oil still present in the filter cartridge, recesses 16 that interrupt the outside thread may be provided in the first clean channel connecting piece 5 through which oil can flow out of the filter cartridge 3 and into the channel 4 while the cartridge is being unscrewed (see FIG. 3). To prevent the cover 11 from also being turned when the filter cartridge 3 is screwed on, a stop (not shown) may be provided on the support element 2, preventing a relative rotational movement of the cover 11 with respect to the support element 2.

In general, the cover 11 may be formed in a wide variety of ways, an embodiment in the form of a collar being illustrated as an example in FIGS. 1 through 6. However, a design of the cover 11 has a sealing ring which is provided on the filter cartridge 3 and is in contact with the inside of the circumferential wall 9 when the filter cartridge 3 is screwed onto the support element 2, thereby sealing the channel 4 at the top. In addition, it is also conceivable for the cover 11 and/or the sealing means 10 to be designed as a sealing ring, which is arranged on the circumferential wall 9 of the support element 2, whereby a sealing lip extends toward the inside of the filter cartridge 3 and is in sealing contact with the filter cartridge 3 when the cartridge is screwed onto the support element 2. Regardless of the design of the sealing means 10, e.g., as a collar or as a sealing ring, it is always ensured that the channel 4 and the drain channel 15 are sealed tightly at the top and therefore soiling of the oil in the channel 4 and/or in the drain channel 15 can be prevented.

To be able to manufacture the sealing means 10 and/or the cover 11 in the most inexpensive manner possible and with flexibility in the shape, they are preferably made of plastic, while the support element 2 is preferably designed as a diecast material, especially diecast aluminum.

It is of course also conceivable for the cover 11 to remain on the support element 2 even when the filter cartridge 3 is being replaced, in particular with an arrangement on the support element 2. For the embodiment in which the cover 11 is arranged on the filter cartridge 3, it can easily be released from the filter cartridge 3 by releasing the catch contour 12 from the counter-catch contour 13 with no problem and connected again to a new filter cartridge 3 in an equally simple manner. Thus, a replacement of the filter cartridge 3 alone is possible while the cover 11 remains on the oil filter device 1 over several life cycles of the filter cartridges 3. An individual cover 11 released from the filter cartridge 3 is shown in FIG. 6.

Replacement of the filter cartridge 3 is described briefly below.

When filter performance is reduced, the filter cartridge 3 should be replaced, which is initiated by unscrewing same from the support element 2. While unscrewing the filter cartridge, the sealing ring 7 of the filter cartridge 3 is released from the sealing surface 8 of a support element 2 and thus opens a connection between the channel 4 and a drain channel 15. At the same time, oil can flow out of the filter cartridge 3 through the recesses 16 interrupting the outside thread and into the channel 4 even while the cartridge is being unscrewed. Until the filter cartridge 3 is completely unscrewed, the channel 4 and/or the drain channel 15 is covered by the cover 11 and is thus protected from soiling. Due to a stop (not shown) on the support element 2, co-rotation of the cover 11 during the screwing or unscrewing of the filter cartridge 3 is prevented. The catch contour 12, which holds the cover 11 on the filter cartridge in the axial direction with the counter-catch contour 13 at the same time allows a relative rotation of the filter cartridge 3 with respect to the cover 11.

The new filter cartridge is unscrewed in a similar manner without the oil entering the environment or escaping from the system in the entire replacement operation.

The invention claimed is:

1. An oil filter device for an internal combustion engine, comprising:
   a support element with a first clean channel connecting piece; and
   a filter cartridge that is selectively connected to the support element, the filter cartridge cooperating with the support element to form a closed housing, the filter cartridge including a second clean channel connecting piece configured to be connected to the first clean channel connecting piece of the support element to remove cleaned oil from the housing, the filter cartridge further including a seal configured to contact a sealing surface of the support element when the filter cartridge is installed to the support element;
   wherein the filter cartridge and support cooperate to define an oil receiving space therebetween when the seal is in contact with the sealing surface of the support element, said oil receiving space being generally surrounded radially by the seal and an interface between the first and second clean channel connecting pieces;
   wherein the filter cartridge is arranged generally upright when the filter cartridge is installed to the support,
   wherein the support defines a ring-shaped drainage channel and an oil reservoir channel, the drainage channel generally surrounds the filter cartridge when the filter cartridge is installed to the support, the drainage channel being positioned radially outwardly from the oil receiving space and defining a portion of the oil reservoir channel such that fluid travels from the oil receiving space radially outwardly to the drainage channel and through the oil reservoir channel into an oil reservoir when the seal does not engage the sealing surface; and
   wherein the drainage channel is fluidically separated from an interior of the filter cartridge when the seal is engaged with the sealing surface, but is in fluid communication with the interior of the filter cartridge through the second clean channel connecting piece when the filter cartridge is partially installed to the support and the seal does not engage the sealing surface.

2. The oil filter device according to claim 1, further comprising a cover configured to prevent contamination of oil in the drainage channel.

3. The oil filter device according to claim 2, wherein the cover is rotatably mounted on the filter cartridge.

4. The oil filter device according to claim 3, wherein the support element includes a stop configured to prevent the cover from rotating relative to the support element when the filter cartridge is turned relative to the support element.

5. The oil filter device according to claim 2, wherein the cover is one of a collar and a sealing ring provided on the filter cartridge.

6. The oil filter device according to claim 5, wherein the cover has an inner contour and an outer contour, the inner contour in contact with the filter cartridge and the outer contour extending around a circumferential wall of the channel, the cover having an axial catch contour formed on the inside contour, the catch contour directed toward the filter cartridge and configured to engage a complementary counter-catch contour.

7. The oil filter device according to claim 6, wherein the counter-catch contour is a circumferential groove.

8. The oil filter device according to claim 6, wherein the cover is mounted on the filter cartridge, the cover configured to rotate about the catch contour when the catch contour is engaged with the complementary catch contour.

9. The oil filter device according to claim 2, wherein an inner surface of an outer contour of the cover engages an outer surface of a circumferential wall of the drainage channel.

10. The oil filter device according to claim 1, wherein the first clean channel connecting piece includes an outer thread and the second clean channel connecting piece has an inner thread, the inner thread complementary to the outer thread.

11. The oil filter device according to claim 10, wherein the outer thread includes at least one recess interrupting the outside thread thereby allowing oil to flow out of the filter cartridge and into the drainage channel through the at least one recess when the filter cartridge is being removed from the support.

12. The oil filter device according to claim 1, wherein the support element is formed of a diecast aluminum material.

13. The oil filter device according to claim 2, wherein the cover is formed of a plastic material.

* * * * *